(12) United States Patent
Bennis et al.

(10) Patent No.: US 11,312,277 B2
(45) Date of Patent: Apr. 26, 2022

(54) VIBRATION DEVICE INTEGRATED INTO A SEAT

(71) Applicant: FAURECIA Sièges d'Automobile, Nanterre (FR)

(72) Inventors: Sophia Bennis, Paris (FR); Lionel Leteve, Saint-Hilaire-Saint-Mesmin (FR); Jérôme Planson, Angerville (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 6 days.

(21) Appl. No.: 17/082,609

(22) Filed: Oct. 28, 2020

(65) Prior Publication Data
US 2021/0129726 A1   May 6, 2021

(30) Foreign Application Priority Data

Oct. 31, 2019 (FR) ..................................... 1912253

(51) Int. Cl.
*B60N 2/70* (2006.01)
*B60N 2/50* (2006.01)
*B60N 2/90* (2018.01)
*G08B 6/00* (2006.01)

(52) U.S. Cl.
CPC ................. *B60N 2/90* (2018.02); *G08B 6/00* (2013.01); *B60N 2002/981* (2018.02)

(58) Field of Classification Search
CPC ..... B60N 2/502; B60N 2/90; B60N 2002/981
See application file for complete search history.

(56) References Cited

U.S. PATENT DOCUMENTS

| 9,511,695 | B2* | 12/2016 | Okubo | ................... | B60N 2/806 |
|---|---|---|---|---|---|
| 9,981,586 | B2* | 5/2018 | Mizobata | ................. | B60N 2/80 |
| 9,981,587 | B2* | 5/2018 | Mizobata | ................. | B60N 2/80 |
| 2008/0079296 | A1* | 4/2008 | Endo | ..................... | B60N 2/002 |
| | | | | | 297/217.2 |
| 2009/0314920 | A1* | 12/2009 | Vukadin | ............... | F16B 21/088 |
| | | | | | 248/562 |
| 2010/0039245 | A1 | 2/2010 | Kerstan | | |
| 2012/0098316 | A1* | 4/2012 | Matsushima | .......... | B60N 2/818 |
| | | | | | 297/391 |
| 2014/0312675 | A1* | 10/2014 | Okubo | ................. | B60N 2/7017 |
| | | | | | 297/410 |

(Continued)

FOREIGN PATENT DOCUMENTS

| EP | 2086814 B1 | 8/2009 |
|---|---|---|
| FR | 2828154 A1 | 2/2003 |

OTHER PUBLICATIONS

French Preliminary Search Report for French App. No. 1912253 dated Jun. 20, 2016, BET1200239 FR, 8 pages, No English Translation avaialble.

*Primary Examiner* — Shin H Kim
(74) *Attorney, Agent, or Firm* — Barnes & Thornburg LLP

(57) ABSTRACT

The present disclosure relates to a vibration device configured to be integrated into a vehicle seat and comprising a vibrator capable of generating vibrations. This device further comprises an attachment mechanism capable of attaching the vibrator to the back or underside of a support layer integrated into a member of the seat, and a damper which is in contact with this support layer and with the vibrator, and which is capable of reducing, in the support layer, the vibrations generated by the vibrator.

10 Claims, 3 Drawing Sheets

(56) References Cited

U.S. PATENT DOCUMENTS

| | | | |
|---|---|---|---|
| 2016/0052431 A1* | 2/2016 | Barnard | B60N 2/02 |
| | | | 701/36 |
| 2016/0058201 A1* | 3/2016 | Pavkov | A47D 13/107 |
| | | | 297/440.22 |
| 2016/0068085 A1* | 3/2016 | Mindel | B60N 2/42709 |
| | | | 297/216.16 |
| 2016/0121770 A1* | 5/2016 | Takahashi | B60N 2/68 |
| | | | 297/452.18 |

* cited by examiner

VIBRATION DEVICE INTEGRATED INTO A SEAT

PRIORITY CLAIM

This application claims priority to French Patent Application No. FR1912253, filed Oct. 31, 2019, which is expressly incorporated by reference herein.

BACKGROUND

The present disclosure relates to a vibration device intended to be integrated into a vehicle seat and comprising a vibrator capable of generating vibrations.

SUMMARY

According to the present disclosure, a vibration device is able to be integrated into a seat in a manner that is the least intrusive to the other devices of the seat, while transmitting the vibrations to the passenger sitting on the seat as effectively as possible.

In illustrative embodiments, vibration device further comprises an attachment mechanism capable of attaching the vibrator to the back or underside of a support layer integrated into a member of the seat, and a damper which is in contact with this support layer and with the vibrator, and which is capable of reducing in this support layer the vibrations generated by the vibrator.

Due to these arrangements, the vibration device does not interfere with other devices integrated into the seat, because it is attached to the back of the support layer of the backrest of the seat and/or to the underside of the support layer of the seating portion of the seat. The vibration device also does not bother the passenger. In addition, the vibrations are transmitted effectively to the passenger without no or very little transmission to the support layer of the backrest and/or seating portion. There is therefore little or no vibration of the backrest itself or of the seating portion itself which could create unwanted noise.

The attachment mechanism comprises a first member and a second member, and the attachment to the support layer by the attachment mechanism is achieved by engagement of the first member with the second member, the vibrator being located between the support layer and the second member.

The attachment of the vibration device to the support layer is thus reliable.

The engagement of the first member with the second member is by snap-fitting.

The assembly or disassembly of these two members is therefore easy.

A portion of the support layer is sandwiched between the first member and the second member.

The attachment of the vibration device to the support layer is therefore more effective.

The damper comprises a first separator and a second separator, the portion of support layer being sandwiched between the first separator and the second separator, the vibrator being located between the second separator and the second member.

The isolation of the support layer from vibrations is thus more effective.

For example, the support layer is composed of a set of parts connected together and chosen from a group comprising springs and rods.

The present disclosure also relates to a vehicle seat comprising at least one of the vibration devices according to the present disclosure, in at least one of its members.

The seat comprises two vibration devices placed one on the right half of the support layer and the other on the left half of the support layer, each of the vibration devices being capable of vibrating independently of one another.

Thus, a passenger sitting on the seat can be notified of an event occurring on his right or on his left depending on which of the vibration devices is activated.

For example, one member is the seating portion of the seat, the vibrator of at least one of the vibration devices being attached to the underside of the support layer.

For example, one member is the backrest of the seat, the vibrator of at least one of the vibration devices being attached to the back of the support layer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
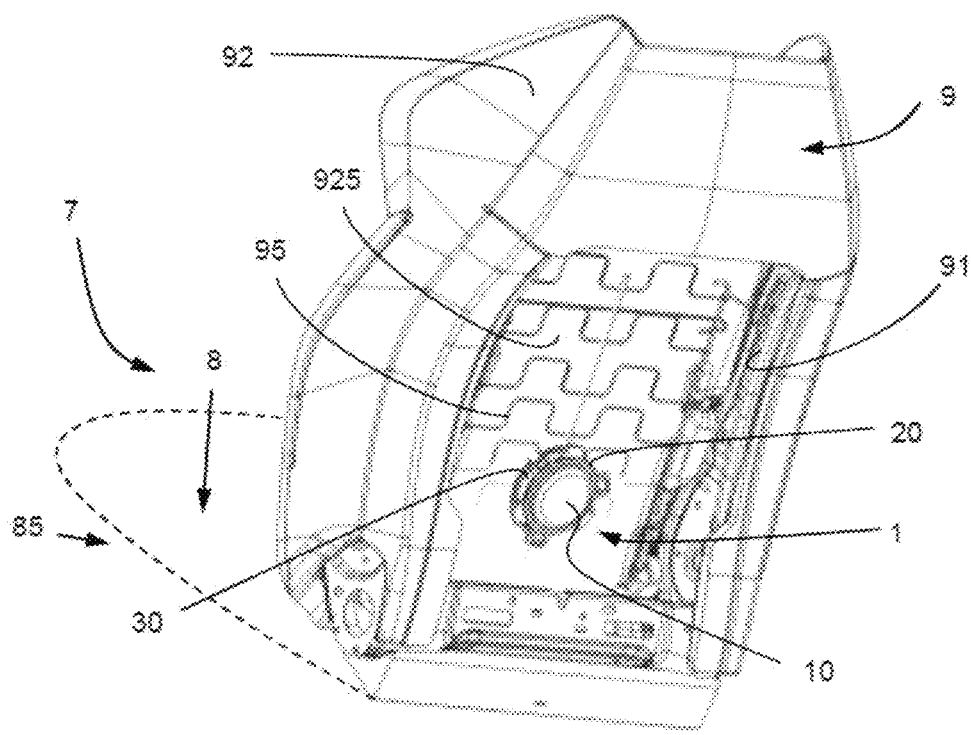
FIG. 1 is a perspective view of a seat backrest comprising a vibration device according to the present disclosure.

A vehicle seat 7 comprises a member which is a seating portion 8, and another member which is a backrest 9. The backrest 9 of a seat 7 of a vehicle is illustrated in FIG. 1 (the seating portion 8 is schematically represented with dotted lines). The backrest 9 comprises a frame 91, generally of metal, which serves as a rigid support (structural portion) for the backrest 9. This frame 91 is covered by a covering 92 comprising a foam 925 which covers at least the front and sides of the frame 91 and a cloth (not shown) which covers the foam 925. The foam 925 serves as a comfortable support for the passenger sitting on the seat 7 (by convention, the passenger sits on the forward side of the seat 7), the back of the seat 7 being the side opposite to the front (forward side) of the seat 7. In FIG. 1, the backrest 9 is illustrated in perspective, as seen from the back.

The frame 91 is a structure that comprises two lateral uprights (right and left), and an upper crossmember connecting the upper ends of the two uprights. Optionally, the structure has a lower crossmember which connects the inner ends of these two uprights and which thus closes the structure.

The backrest 9 further comprises a support layer 95 which is surrounded by this structure and fixed to this structure. This support layer 95 serves as a support for the foam 925, and provides a suspension function to ensure that the passenger/occupant of the seat 7 is comfortable. The foam 925 is located on the forward side (front) of the support layer 95.

For example, as shown in FIG. 1 (and in FIGS. 2, 3 and 4), this support layer 95 consists of a set of curved and intersecting rods fixed together. The support layer 95 may also be made up of intersecting springs fixed together. More generally, the support layer 95 is composed of a set of parts, possibly interconnected, and chosen from the group comprising springs and curved or straight rods.

A vibration device 1 is integrated into the backrest 9. This device 1 comprises a vibrator 10 which is capable of generating vibrations. This device 1 further comprises an attachment mechanism 20 which makes it possible to attach the vibrator 10 to the back of the support layer 95. The device 1 further comprises a damper 30 which is in contact with both the support layer 95 and the vibrator 10, and which is capable of reducing (and ideally eliminating) in the support layer 95 the vibrations generated by the vibrator 10. The vibrator 10 is fixed to the back of the support layer 95. It is therefore not embedded in the foam 925 which forms the forward side of the seat. The vibration device 1 therefore does not obstruct the positioning of other devices integrated into the foam 925 and does not interfere with these devices.

Figure 2:
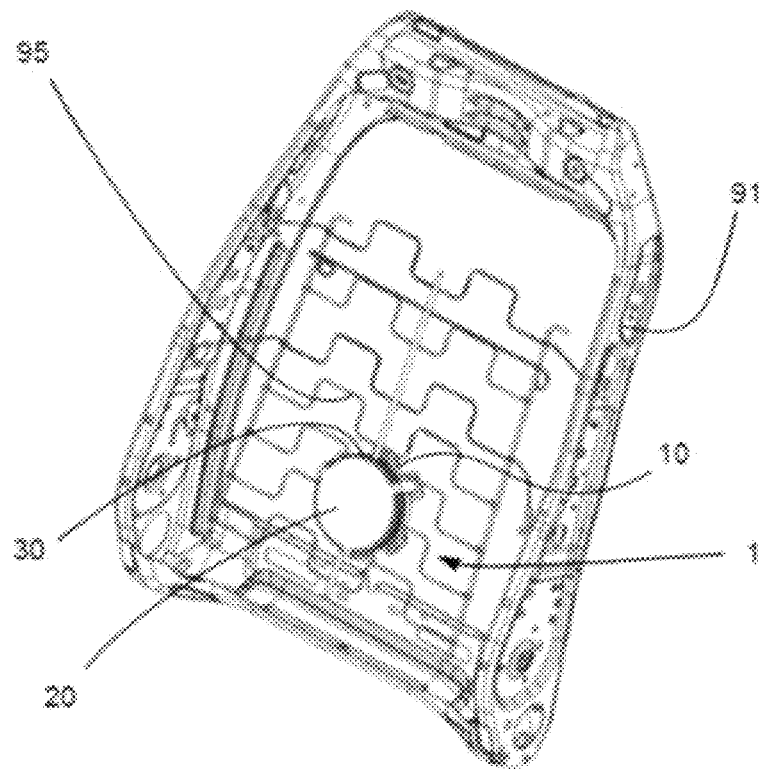
FIG. 2 is a perspective and front view of a vibration device according to the present disclosure, mounted on a support layer of the backrest of a seat.
Figure 3:
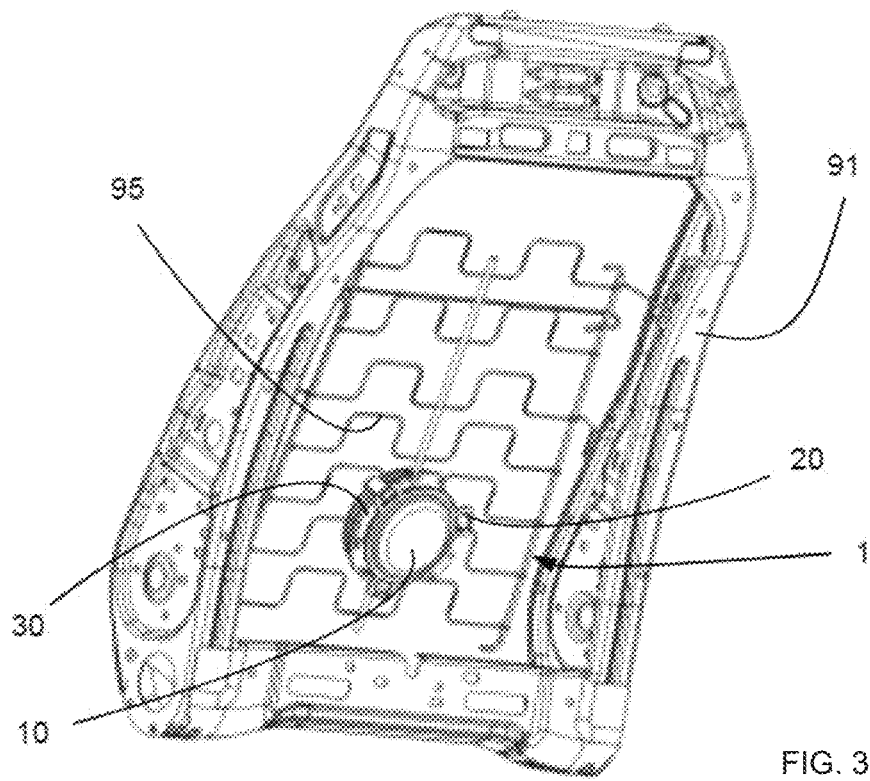
FIG. 3 is a perspective and rear view of a vibration device according to the present disclosure, mounted on a support layer of the backrest of a seat.

FIG. 2 is a perspective front view of the frame 91 of the backrest 9 of FIG. 1, meaning without the cover 92. FIG. 3 is a perspective rear view of this frame 91. One can see in these figures that the vibration device 1 comprises an attachment mechanism 20 by means of which it is attached to the support layer 95. The attachment mechanism 20 thus comprises a first member 21 and a second member 22, the first member 21 being on the forward side of the support layer 95 and the second member 22 being on the back of the support layer 95. A portion 955 of the support layer 95 is thus sandwiched between the first member 21 and the second member 22. These members (21, 22) and this portion (955) are visible in FIG. 4 (see below). In the case where the support layer 95 is a set of rods, a portion of the rods constitutes the support layer 95.

The attachment of the vibration device 1 to the support layer 95 by the attachment mechanism 20 is achieved by an engagement between the first member 21 and the second member 22. Part of the first member 21 or of the second member 22 therefore passes through the support layer 95 in order to achieve this engagement. The vibrations of the vibrator 10 are transmitted by this engagement (physical connection) to the first member 21 which then distributes the vibrations forward, towards the passenger. The first member 21, which is located on the front of the support layer 95 and is therefore closer to the passenger, therefore has a transmitter function.

For example, the attachment by the attachment mechanism 20 is carried out by screwing, one among the first member 21 and the second member 22 carrying a screw, and the other among the first member 21 and the second member 22 carrying a tapped hole into which the screw can be screwed.

Figure 4:
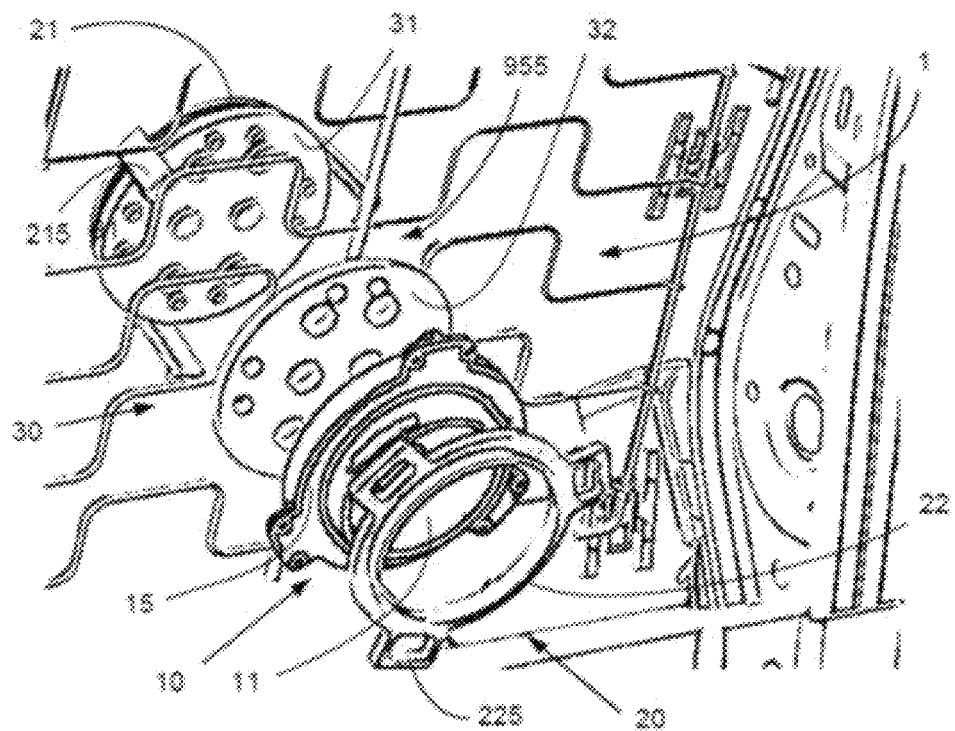
FIG. 4 is an exploded perspective view of a vibration device according to the present disclosure.

Alternatively, as shown in FIG. 4, the attachment of the first member 21 to the second member 22 is achieved by snap-fitting the first member 21 to the second member 22. FIG. 4 is an exploded perspective view of the vibration device 1, which illustrates the respective positions of the first member 21, second member 22, and vibrator 10. Thus, the first member 21 is provided with a plurality of arms 215, for example three as shown in the figures, and the second member 22 is provided with a plurality of reliefs 225 in a number equal to the plurality of arms 215. During the attachment between the first member 21 and the second member 22, each of the arms 215 passes through the support layer 95, for example between two rods. The end of each arm 215 then snaps into one of the reliefs 225.

For example, the reliefs 225 are loops, as shown in FIG. 4, and each of the arms 215 enters a hole of a loop in order to snap into place.

The second member 22 is supported on a protrusion 15 of the vibrator 10, so that after the first member 21 has been snapped into the second member 22, the protrusion 15 is held between the second member 22 and the support layer 95. As a result, the vibrator 10 is held between the second member 22 and the support layer 95, and is thus integral with the support layer 95. For example, the vibrator 10 comprises a central core 11 and a protrusion 15 which surrounds this central core 11. For example, the protrusion 15 is an annular flange (collar) and the second member 22 is a ring which surrounds the central core 11 and bears on this protrusion 15 and which carries on its radial periphery the loops (reliefs 225) which protrude radially outwards from the flange.

Alternatively, the first member 21 is provided with a plurality of reliefs, and the second member 22 is provided with a plurality of arms which each snap into one of the reliefs.

The vibration device 1 further comprises a damper 30 which is in contact with the support layer 95 and with the vibrator 10, and which is capable of reducing or even eliminating the vibrations generated by the vibrator 10 in the support layer 95. Advantageously, the damper 30 is shaped to be held between the first member 21 and the second member 22 of the attachment mechanism 20. For example, the damper 30 comprises a first separator 31 and a second separator 32, the portion 955 of support layer 95 being sandwiched between the first separator 31 and the second separator 32. The first separator 31 is thus sandwiched between the first member 21 of the attachment mechanism 20 and the support layer 95. Similarly, the second separator 32 is sandwiched between the second member 22 of the attachment mechanism 20 and the support layer 95. The second separator 32 is in contact with the vibrator 10 and with the support layer 95, and separates the vibrator 10 and the portion 955 so that the vibrator 10 is not in contact with the support layer 95. The damper 30 is made of a material capable of damping vibrations. For example, this material is an elastomer.

As shown in FIG. 4, the first separator 31 and the second separator 32 are each a disc. The arms 215 of the first member 21, three in number, are located close to or in contact with the periphery of each of these discs, and thus keep the first separator 31 and the second separator 32 centered (coaxial) with the first member 21 and second member 22. Alternatively, the arms 215 pass through the first separator 31 and second separator 32 in order to hold them in place.

The present disclosure has been described above in the case where the support layer 95 to which the vibrator 10 is attached is integrated into the backrest 9 of the seat 7. The member of the seat 7 is then its backrest 9.

Additionally or alternatively, the support layer on which the vibrator 10 is attached is integrated into the seating portion 8 of the seat 7. The member of the seat 7 is then its seating portion 8.

Figure 5:
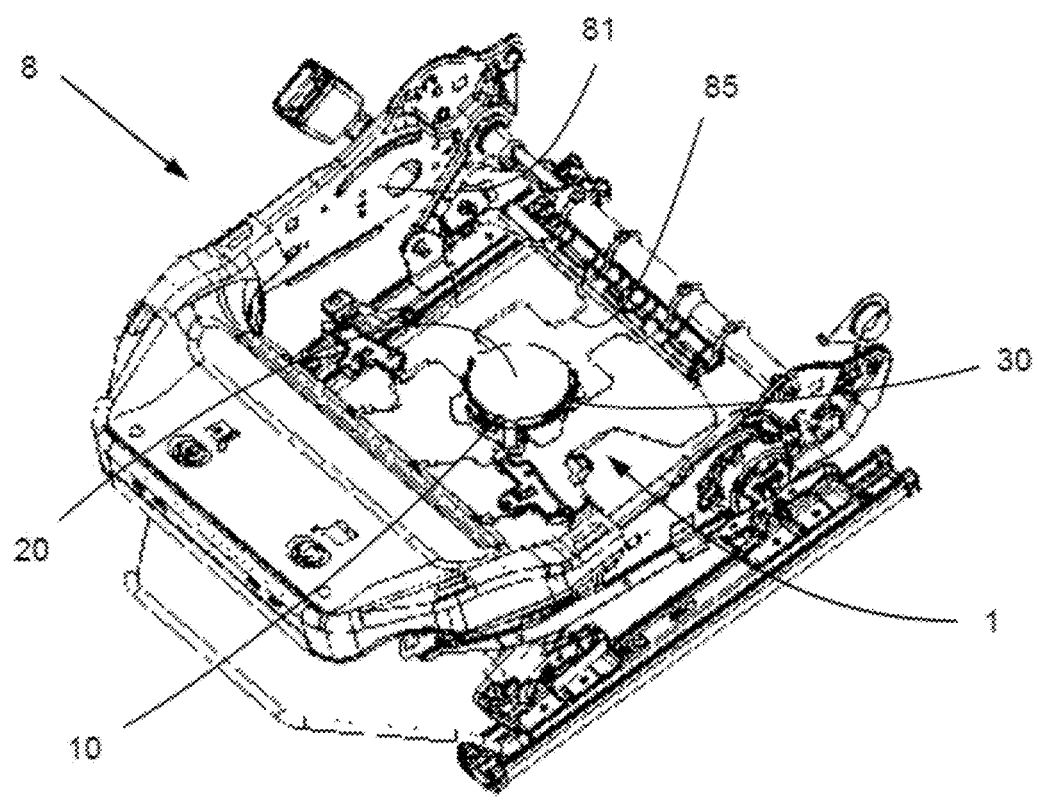
FIG. 5 is a perspective view from above of a vibration device according to the present disclosure, mounted on a support layer of the backrest of a seat.

The seating portion 8 comprises a frame 81, generally of metal, which serves as a rigid support (structural portion) for the seating portion 8. This frame 81 is covered by a covering (not shown) comprising a foam which covers at least the top and sides of the frame 81 and a cloth which covers the foam. The foam serves as a comfortable support for the passenger sitting on the seat 7 (by convention, the passenger sits on top of the seat 7), the underside of the seat 7 being the side opposite to the top of the seat 7. In FIG. 5, the seating portion 8 is illustrated in perspective, as seen from above.

The frame 81 is a structure that comprises two lateral uprights (right and left), and a front crossmember connecting the front ends of these two uprights. Optionally, the structure comprises a back crossmember which connects the back ends of these two uprights and which thus closes the structure.

The seating portion 8 further comprises a support layer 85 which is surrounded by this structure and fixed to this structure. This support layer 85 serves as a support for the foam, and provides a suspension function to ensure that the passenger/occupant of the seat 7 is comfortable. The foam which supports the passenger sitting on the seating portion 8 is located on top of the support layer 85.

All of the above description for the case of a backrest 9 applies to the case of a seating portion 8, by replacing the terms "back" by "underside", "front" by "top", "frame 91" by "frame 81", "support layer 95" by "support layer 85", and "portion 955 of the support layer 95" by "portion of the support layer 85", the other terms (attachment mechanism and its members, damper, separators) and references (20, 21, 22, 30, 31, 32) remaining the same. Thus, the vibrator 10 is fixed to the underside of the support layer 85 of the seating portion 8, as illustrated in FIG. 4.

The present disclosure also relates to one or more vehicle seat 7 members comprising at least one of the vibration devices 1 described above. These members are a seating portion 8 and/or a backrest 9. A control device (not shown) is capable of causing the vibration devices 1 to vibrate (or to cease vibrating).

For example, the seating portion 8 and/or the backrest 9 comprises two vibration devices 1 placed one on the right half of the support layer (85, 95) (right vibration device 1) and the other on the left half of the support layer (85, 95) (left vibration device 1), each of these vibration devices being able to vibrate independently of one another (the right and left halves are defined relative to a passenger sitting on the seat, and therefore respectively correspond to the right and left sides of this passenger). Thus, a control device is able to cause either the left vibration device 1, or the right vibration device 1, or both devices simultaneously, to vibrate. The passenger sitting on the seat can thus be informed of an event (for example a hazard) which is occurring on the right (respectively on the left) of the vehicle, by vibration of the right vibration device (respectively of the left vibration device). For this purpose, the control device is connected to sensors on the left and right of the vehicle, and activates one or the other of the vibration devices depending on which sensor has received a signal. In the case where both the seating portion 8 and the backrest 9 comprise a right vibration device 1 and a left vibration device 1, the seat 7 then comprises four vibration devices 1.

The vibration device(s) 1 may have other objectives, for example contributing to relaxing the muscles of the passenger, and to the comfort of the passenger sitting on the seat 7.

Comparative vibration devices may be integrated into a seat in order to transmit vibrations to the passenger sitting on the seat. The transmission of these vibrations to the passenger can have various purposes.

For example, the comparative vibration device comprises a vibrator (without a membrane for transmitting sound) which is embedded in the foam that forms part of the backrest of the seat and that supports the passenger. This solution has the advantage that the vibrations are transmitted more effectively to the passenger, since the comparative vibrator is closer to the passenger. However, the comparative vibrator may then interfere with other devices integrated into the seat.

The present disclosure aims to overcome these disadvantages.

The present disclosure aims to provide a vibration device which is able to be integrated into a seat in a manner that is the least intrusive to the other devices of the seat, while transmitting the vibrations to the passenger sitting on the seat as effectively as possible.

This object is achieved due to the fact that the device further comprises an attachment mechanism capable of attaching the vibrator to the back or underside of a support layer integrated into a member of the seat, and a damper which is in contact with this support layer and with the vibrator, and which is capable of reducing in this support layer the vibrations generated by the vibrator.

Due to these arrangements, the vibration device does not interfere with other devices integrated into the seat, because it is attached to the back of the support layer of the backrest of the seat and/or to the underside of the support layer of the seating portion of the seat. The vibration device also does not bother the passenger. In addition, the vibrations are transmitted effectively to the passenger without no or very little transmission to the support layer of the backrest and/or seating portion. There is therefore little or no vibration of the backrest itself or of the seating portion itself which could create unwanted noise.

Advantageously, the attachment mechanism comprises a first member and a second member, and the attachment to the support layer by the attachment mechanism is achieved by engagement of the first member with the second member, the vibrator being located between the support layer and the second member.

The attachment of the vibration device to the support layer is thus reliable.

The engagement of the first member with the second member is by snap-fitting.

The assembly or disassembly of these two members is therefore easy.

A portion of the support layer is sandwiched between the first member and the second member.

The attachment of the vibration device to the support layer is therefore more effective.

The damper comprises a first separator and a second separator, the portion of support layer being sandwiched between the first separator and the second separator, the vibrator being located between the second separator and the second member.

The isolation of the support layer from vibrations is thus more effective.

For example, the support layer is composed of a set of parts connected together and chosen from a group comprising springs and rods.

The present disclosure also relates to a vehicle seat comprising at least one of the vibration devices according to the present disclosure, in at least one of its members.

The seat comprises two vibration devices placed one on the right half of the support layer and the other on the left half of the support layer, each of the vibration devices being capable of vibrating independently of one another.

Thus, a passenger sitting on the seat can be notified of an event occurring on his right or on his left depending on which of the vibration devices is activated.

For example, one member is the seating portion of the seat, the vibrator of at least one of the vibration devices being attached to the underside of the support layer.

For example, one member is the backrest of the seat, the vibrator of at least one of the vibration devices being attached to the back of the support layer.

The present disclosure relates to a vibration device 1 intended to be integrated into a vehicle seat 7 and comprising a vibrator 10 capable of generating vibrations. This device 1 further comprises an attachment mechanism 20 capable of attaching the vibrator 10 to the back or underside of a support layer 85, 95 integrated into a member 8, 9 of the seat 7, and a damper 30 which is in contact with this support layer 85, 95 and with the vibrator 10, and which is capable of reducing, in the support layer 85,95, the vibrations generated by the vibrator 10.

The following numbered clauses include embodiments that are contemplated and non-limiting:

Clause 1. A vibration device (1) intended to be integrated into a vehicle seat (7) and comprising a vibrator (10) capable of generating vibrations, this device (1) being characterized in that it further comprises an attachment mechanism (20) capable of attaching the vibrator (10) to the back or underside of a support layer (85, 95) integrated into a member (8, 9) of the seat (7), and a damper (30) which is in contact with the support layer (85, 95) and with the vibrator (10), and which is capable of reducing, in the support layer (85, 95), the vibrations generated by the vibrator (10).

Clause 2. The vibration device (1) according to clause 1, wherein the attachment mechanism (20) comprises a first member (21) and a second member (22), and wherein the attachment to the support layer (85, 95) by the attachment mechanism (20) is achieved by engagement of the first member (21) with the second member (22), the vibrator (10) being located between the support layer (85, 95) and the second member (22).

Clause 3. The vibration device (1) according to clause 2, wherein the engagement of the first member (21) with the second member (22) is by snap-fitting.

Clause 4. The vibration device (1) according to clauses 2 or 3, wherein a portion (955) of the support layer (85, 95) is sandwiched between the first member (21) and the second member (22).

Clause 5. The vibration device (1) according to clause 4, wherein the damper (30) comprises a first separator (31) and a second separator (32), the portion (955) of support layer (85, 95) being sandwiched between the first separator (31) and the second separator (32), the vibrator (10) being located between the second separator (32) and the second member (22).

Clause 6. The vibration device (1) according to any one of clauses 1 to 5, wherein the support layer (85, 95) is composed of a set of parts chosen from a group comprising springs and rods.

Clause 7. The vehicle seat (7) comprising at least one of the vibration devices (1) according to any one of the preceding clauses, in at least one of its members (8, 9).

Clause 8. The seat (7) according to clause 7, wherein it comprises two vibration devices (1) placed one on the right half of the support layer (85, 95) and the other on the left half of the support layer (85, 95), each of the vibration devices (1) being capable of vibrating independently of one another.

Clause 9. The seat (7) according to clause 7 or 8, wherein one member (8, 9) is the seating portion (8) of the seat (7), the vibrator (10) of at least one of the vibration devices (1) being attached to the underside of the support layer (85).

Clause 10. The seat (7) according to one of clauses 7 to 9, wherein one member (8, 9) is the backrest (9) of the seat (7), the vibrator (10) of at least one of the vibration devices (1) being attached to the back of the support layer (95).

The invention claimed is:

1. A vibration device configured to be integrated into a vehicle seat, the vibration device comprising
a vibrator capable of generating vibrations,
wherein the vibrator comprises an attachment mechanism capable of attaching the vibrator to the back or underside of a support layer integrated into a member of the seat, and a damper which is in contact with the support layer and with the vibrator, and which is capable of reducing, in the support layer, the vibrations generated by the vibrator.

2. The vibration device of claim 1, wherein the attachment mechanism comprises a first member and a second member, and wherein the attachment to the support layer by the attachment mechanism is achieved by engagement of the first member with the second member, the vibrator being located between the support layer and the second member.

3. The vibration device of claim 2, wherein the engagement of the first member with the second member is by snap-fitting.

4. The vibration device of claim 2, wherein a portion of the support layer is sandwiched between the first member and the second member.

5. The vibration device of claim 4, wherein the damper comprises a first separator and a second separator, the portion of support layer being sandwiched between the first separator and the second separator, the vibrator being located between the second separator and the second member.

6. The vibration device of claim 1, wherein the support layer is composed of a set of parts chosen from a group comprising springs and rods.

7. A vehicle seat comprising at least one of the vibration devices according to claim 1, in at least one of its members.

8. The vehicle seat of claim 7, wherein it comprises two vibration devices placed one on the right half of the support layer and the other on the left half of the support layer, each of the vibration devices being capable of vibrating independently of one another.

9. The vehicle seat of claim 7, wherein one member is the seating portion of the seat, the vibrator of at least one of the vibration devices being attached to the underside of the support layer.

10. The vehicle seat of claim 7, wherein one member is the backrest of the seat, the vibrator of at least one of the vibration devices being attached to the back of the support layer.

* * * * *